(12) United States Patent
Satou et al.

(10) Patent No.: US 7,449,819 B2
(45) Date of Patent: Nov. 11, 2008

(54) KNOCK SENSOR

(75) Inventors: Souichi Satou, Aioi (JP); Harumasa Shibata, Chiyoda-ku (JP); Akito Yokoi, Chiyoda-ku (JP); Koji Tanimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 35 days.

(21) Appl. No.: 11/644,908

(22) Filed: Dec. 26, 2006

(65) Prior Publication Data

US 2007/0228888 A1 Oct. 4, 2007

(30) Foreign Application Priority Data

Mar. 30, 2006 (JP) ............................. 2006-095038

(51) Int. Cl.
*H01L 41/113* (2006.01)

(52) U.S. Cl. ..................................... 310/338; 73/35.11

(58) Field of Classification Search ................ 73/35.11, 73/35.13; 310/338
See application file for complete search history.

(56) References Cited

U.S. PATENT DOCUMENTS

| | | | |
|---|---|---|---|
| 6,212,940 B1 * | 4/2001 | Castaing et al. ............ 73/35.11 |
| 6,532,795 B1 * | 3/2003 | Brammer et al. ........... 73/35.11 |
| 6,868,714 B2 * | 3/2005 | Mueller et al. ............. 73/35.11 |
| 6,923,041 B2 * | 8/2005 | Harada et al. ............... 73/35.07 |
| 7,007,544 B2 * | 3/2006 | Shibata et al. ............. 73/35.11 |
| 2005/0229678 A1 * | 10/2005 | Shibata et al. ............. 73/35.11 |
| 2006/0090543 A1 * | 5/2006 | Shibata et al. ............. 73/35.11 |

FOREIGN PATENT DOCUMENTS

| | | |
|---|---|---|
| DE | 102004054763 A1 | 11/2005 |
| DE | 112005001854 T5 | 8/2007 |
| JP | 2002-257624 A | 9/2002 |
| JP | 2005-308482 A | 11/2005 |
| KR | 2005-0102043 A | 10/2005 |

OTHER PUBLICATIONS

German Office Action dated Jul. 18, 2008.

* cited by examiner

*Primary Examiner*—Thomas M Dougherty
(74) *Attorney, Agent, or Firm*—Sughrue Mion, PLLC

(57) ABSTRACT

A knock sensor includes: a base including an annular flange portion and a cylindrical portion, an annular piezoelectric element fitted onto the cylindrical portion, electrode portions oppositely formed on front and rear surfaces of the annular piezoelectric element, first and second terminal plates in contact with the electrode portions, an annular weight, a first insulating sheet interposed between the first terminal plate and the flange portion, a second insulating sheet interposed between the second terminal plate and the weight. The electrode portions include annular partial electrodes each having a width narrower than a radial width of the piezoelectric element. The annular partial electrode has a thickness d satisfying: L/d<80 where L is a radial dimension of outer circumferences of the front and rear surfaces where the electrode portions are not arranged.

6 Claims, 6 Drawing Sheets

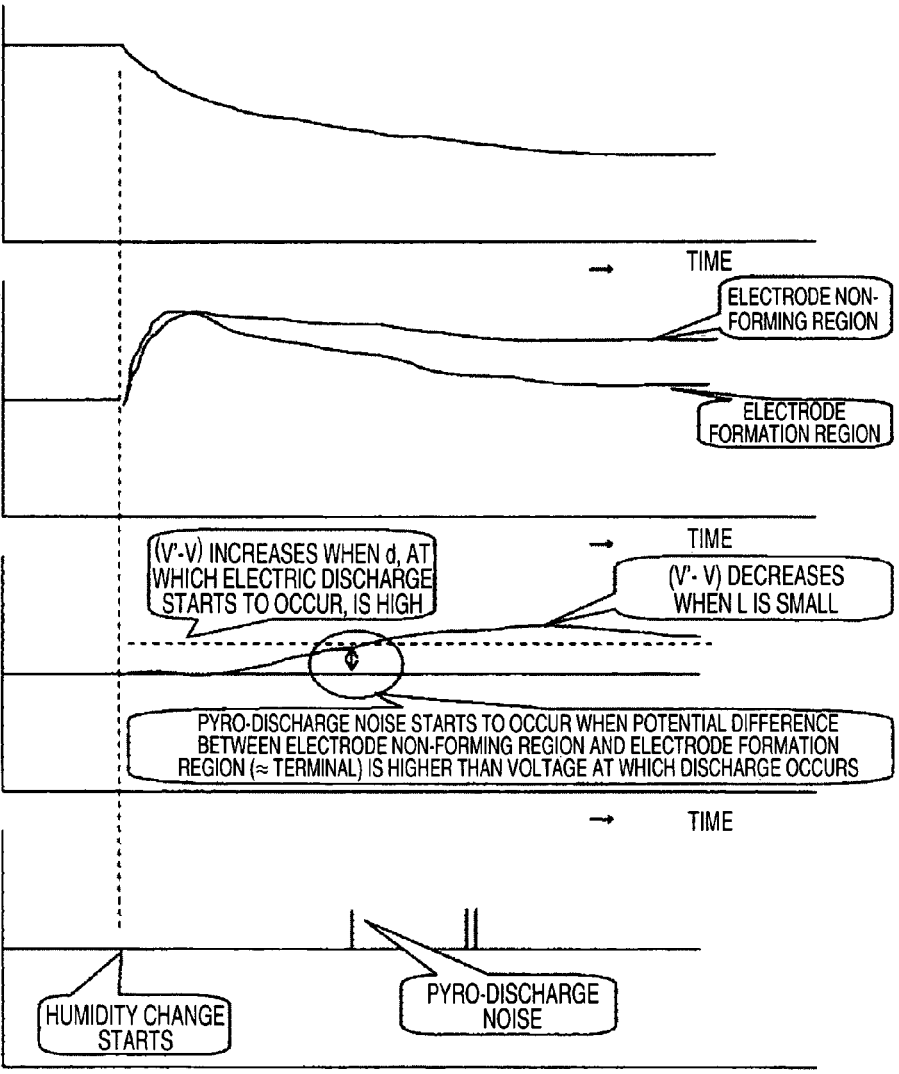

KNOCK SENSOR

BACKGROUND OF THE INVENTION

1. Field of the Invention

The present invention relates to a nonresonant knock sensor that is mounted on, for example, an internal combustion engine with bolts and that is adapted to convert, when a knocking vibration is generated in the internal combustion engine, the knocking vibration into an electric signal through the use of a piezoelectric element supported by being sandwiched therein and to lead out the voltage signal as an output signal.

2. Background Art

A related knock sensor includes a metallic sleeve which has a cylindrical portion, and a flange portion formed at a lower part of the cylindrical portion, and which is configured so that a screw is formed on an upper outer circumferential surface of the cylindrical portion. Also, a first annular electrode plate is fitted onto the cylindrical portion to be placed on the flange portion through an insulating plate. An annular piezoelectric element is fitted onto the cylindrical portion to be placed on the first annular electrode plate. A second annular electrode plate is fitted onto the cylindrical portion to be placed on the annular piezoelectric electrode plate. Also, an over lapping part is placed onto the cylindrical portion to be placed on the second annular electrode plate. Then, a nut is screwed onto a screw to be mounted thereon. The nut is attached thereto by being tighten so that each of the members is pinch-held between the nut and the flange portion. Also, a synthetic resin case is mold-formed around the metallic sleeve. Each of the members is embedded in the synthetic resin case (see, for example, JP-A-2002-257624).

This annular piezoelectric element is configured so that electrode layers are formed on the entire front and rear surfaces thereof, respectively. The annular piezoelectric element is polarized in the direction of thickness thereof. Also, the first and second annular electrode plates are shaped to have the same inside and outside diameters as those of the annular piezoelectric element. The first and second annular electrode plates are in close contact with the front and rear electrode layers, respectively, to thereby ensure an electrical connection state therebetween. Also, connecting rod portions are outwardly extended from the circumferential edges of the first and second annular electrode plates, respectively. The connecting rod portions are electrically connected to a pair of terminals of a connector portion formed integrally with the synthetic resin case, respectively.

The related knock sensor configured in this manner is attached to an internal combustion engine with bolts inserted in the cylindrical portion of a metal bush. Further, when a knocking occurs in the internal combustion engine, components, such as the annular piezoelectric elements and the overlapping parts, are vibrated with the knocking vibration. This vibration is converted into a voltage signal by the piezoelectric element. This voltage signal is outputted to the outside through a female coupler fitted onto the connector portion, and is supplied to an engine control unit (ECU) adapted to control the internal combustion engine.

SUMMARY OF THE INVENTION

In the related knock sensor, the first and second annular electrode plates are shaped to have the same inside and outside diameters as those of the annular piezoelectric element. Also, the electrode layers are formed on the entire front and rear surfaces of the annular piezoelectric element, which are in contact with the first and second annular electrode plates, respectively. Additionally, the electrostatic capacity of the piezoelectric element is determined by a thickness thereof and a level corresponding to the area of the electrode layer. The level of the output signal extracted according to the knocking vibration is determined to a predetermined level. However, the level of the output signal extracted according to the knocking vibration can be changed by changing the thickness or the diameter of the piezoelectric element. The necessity for changing the outer shape of the knock sensor arises.

It is necessary for solving this problem to partially form electrodes on the front and rear surfaces of the annular piezoelectric element without forming the electrode layers on the entire front and rear surfaces of the annular piezoelectric element brought into contact with the first and second annular electrode plates. However, in a case where the electrode layers are partially formed on the front and rear surfaces of the annular piezoelectric element, respectively, a gap corresponding to the thickness of the electrode layer is present between the piezoelectric element and each of the first and second electrode plates, the following problems.

That is, when the annular piezoelectric element performs polarizing on an electrode layer forming portion, a polarizing action is exerted on an electrode layer non-forming portion in the periphery of the electrode layer forming portion. Electric charges generated by pyroelectric effects due to change in the temperature of the knock sensor are gradually and slowly discharged in the electrode layer forming portion through the first and second annular electrode plates, while the charges are stored in an electrode layer non-forming portion. The charges stored in the electrode layer non-forming portion of this annular piezoelectric element cause dielectric breakdown at a voltage corresponding to the gap provided between the annular piezoelectric element and each of the first and second annular electrode plates, so that the charges are instantaneously discharged toward the first and second annular electrode plates. The charges moved to the first and second annular electrode plates at this discharge are applied to the annular piezoelectric element by being returned thereto. At that time, the electric charges, whose polarity is the same as that of the electrode of the annular piezoelectric element, are applied thereto. Thus, the annular piezoelectric element instantaneously extends in a polarizing direction, so that electric charges of the opposite polarity are stored therein. Consequently, in a case where the related knock sensor partially forms the electrode layers of the annular piezoelectric element, noises due to change in the temperature are superimposed onto output signals. Thus, the related knock sensor has a problem in that a signal is erroneously determined to be a knocking signal.

The invention is accomplished to solve the problems. Accordingly, an object of the invention is to obtain a knock sensor that is enabled to realize a sensor structure which can change output sensitivity can be changed without changing the outer shape of the sensor, and that is enabled to suppress the generation of noises due to change in temperature.

The invention provides a knock sensor, including: a base including an annular flange portion and a cylindrical portion that is axially extended from the flange portion, the base being provided with a through hole axially penetrate the flange portion and the cylindrical portion; an annular piezoelectric element fitted onto the cylindrical portion; electrode portions oppositely formed on front and rear surfaces of the annular piezoelectric element; first and second terminal plates fitted onto the piezoelectric element, and being in close contact with the electrode portions to draw output signals from said piezoelectric element; an annular weight fitted onto the cylindrical portion to supply an excitation force to the piezoelectric element; a first insulating sheet interposed between the first terminal plate and the flange portion to electrically insulate the first terminal plate from the flange portion; a second insulating sheet interposed between the second terminal plate and the weight to electrically insulate the second terminal plate from the weight; and a holding unit that holds a laminated body of the first insulating sheet, the first terminal plate, the piezoelectric element, the second terminal plate, the second insulating sheet and the weight, such that the laminated body is clamped between the flange portion and the holding unit; wherein each of the electrode portions includes a corresponding one of annular partial electrodes respectively formed to an outer circumference of the front and rear surfaces of the piezoelectric element, each of the annular partial electrodes having a width narrower than a radial width of the piezoelectric element; and the annular partial electrodes has a thickness d that satisfies the following inequality: L/d<80 where L is a radial dimension of outer circumferences of the front and rear surfaces where the electrode portions are not arranged.

According to the invention, the electrode layers formed in the piezoelectric element can be configured as partial electrodes. Thus, the invention can obtain an advantage in that the output sensitivity can be changed without changing the outer shape of the sensor. Also, the invention can obtain a stable output even in a case where the electrode layers in the piezoelectric element are configured as partial electrodes, without superimposing noises, which are caused due to change in ambient air, on an output signal.

BRIEF DESCRIPTION OF THE DRAWINGS

The present invention may be more readily described with reference to the accompanying drawings:

FIGS. 3A-3D are conceptual graphs illustrating the behavior of each of voltages generated in a piezoelectric element due to pyroelectric effects.

DETAILED DESCRIPTION OF THE PREFERRED EMBODIMENTS

First Embodiment

Figure 1:
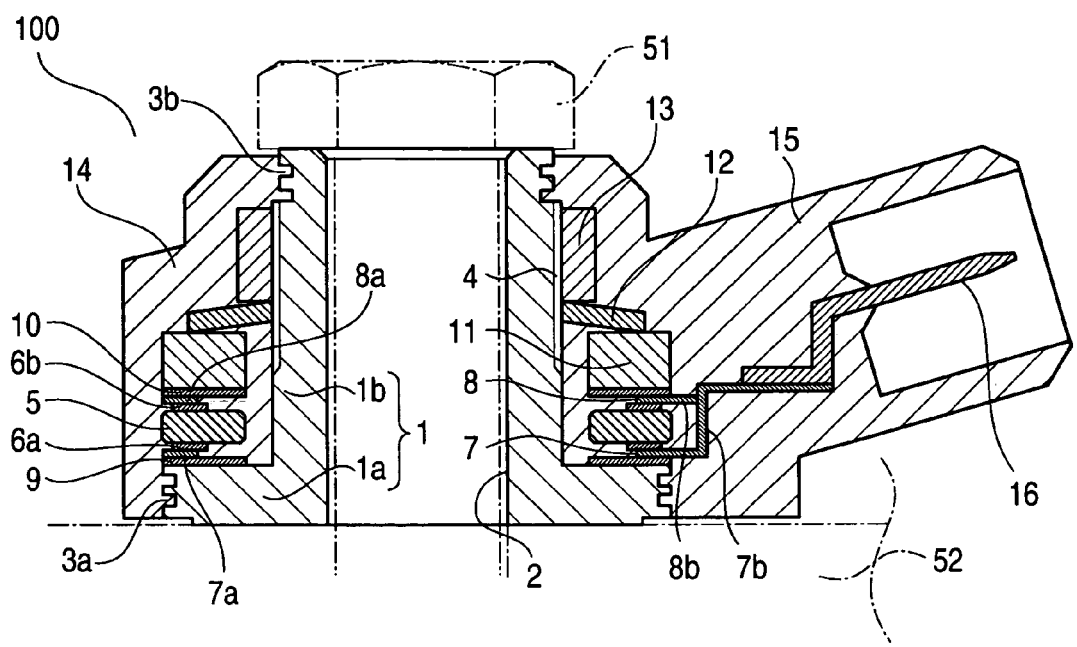
FIG. 1 is a longitudinally cross-sectional view illustrating a knock sensor according to a first embodiment of the invention.
Figure 2:
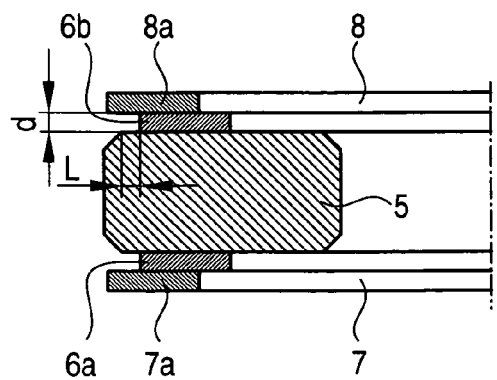
FIG. 2 is an enlarged cross-sectional view illustrating a primary part of the knock sensor according to the first embodiment of the invention.

FIG. 1 is a longitudinally cross-sectional view illustrating a knock sensor according to a first embodiment of the invention. FIG. 2 is an enlarged cross-sectional view illustrating a primary part of the knock sensor according to the first embodiment of the invention.

As shown in FIGS. 1 and 2, a base 1 is made of a metal material, such as an SWCH (a cold forging steel material). The base 1 has an annular flange portion 1a and a cylindrical portion 1b extending in an axial direction from the flange portion 1a. A through hole 2 is formed to axially penetrate the flange portion 1a and the cylindrical portion 1b. Also, a plurality of engaging grooves 3a and 3b are formed in an outer circumferential surface of the flange portion 1a and an end outer-circumferential surface of the cylindrical portion 1b, respectively. Additionally, a male screw portion 4 is threaded in a predetermined area of a tip-end-side outer circumferential surface of the cylindrical portion 1b.

The piezoelectric element 5 is manufactured like an annular flat plate by using piezoelectric materials, for example, $Pb(Zr, Ti)O_3$-based or $PbTiO_3$-based piezoelectric ceramics or $LiNbO_3$ piezoelectric single crystal. The piezoelectric element 5 is fitted onto the cylindrical portion 1b of the base 1. The piezoelectric element 5 is provided with a predetermined C-chamfered part formed at an outer circumferential end. Also, partial electrodes 6a, 6b are formed concentrically with the piezoelectric element 5 in an annular shape, whose width is narrower than the radial width of the piezoelectric element 5, to face the radial outer circumferential portion of the front and rear surfaces of the piezoelectric element 5 by being spaced at a predetermined radial distance L from an end of the C-chamfered part. The partial electrodes 6a and 6b are obtained by applying an electrically conductive material, such as silver paste, thereto and then burning the material to have a predetermined thickness d (ranging from several microns to ten-odd microns or so). Incidentally, the partial electrodes 6a and 6b are formed so that the radial interval L of an outer circumferential terminal portion electrode non-forming surface and the thickness of the electrode thickness meet the following inequality: L/d<80, more preferably, L/d<50.

The term "partial electrode" means an annular electrode formed to partially cover an electrode formation surface of a piezoelectric element, while the term "full-face electrode" means an electrode formed to cover the whole electrode formation surface of the piezoelectric element. The partial electrodes 6a and 6b of the piezoelectric element 5 undergo polarization. The piezoelectric element 5 has electrostatic capacity corresponding to the thickness thereof and to the area of the partial electrodes 6a and 6b. This electrostatic capacity is a factor that determines the output sensitivity of the knock sensor. Additionally, the expression "electrode film thickness d" means a ten-point average roughness $R_z$ obtained by measuring the bumps of an electrode through the use of a surface roughness meter.

The first and second terminal plates 7 and 8 are manufactured by using electrically conductive metal materials, such as copper and stainless steel. Each of the first and second terminal plates 7 and 8 has a corresponding one of annular portions 7a and 8a, each of which has an inside diameter set to be larger than the inside diameter of each of the partial electrodes 6a and 6b and which also has an outside diameter substantially equal to that of the piezoelectric element 5. Each of the first and second terminal plates 7 and 8 also has a corresponding one of connection terminals 7b and 8b that are radially outwardly and respectively extended from the annular portions 7a and 8a. The first and second terminal plates 7 and 8 are fitted onto the cylindrical portion 1b so that the annular portions 7a and 8a cover the partial electrodes 6a and 6b from both sides of the piezoelectric element 5, respectively. Also, each of the connection terminal portions 7b and 8b is twice folded like a crank and is connected to an electric terminal 16 of a connector portion 15, which will be described later.

The first insulating sheet 9 is manufactured by forming an insulating resin film, for example, a polyester film like a tube. The first insulating sheet 9 is interposed between the annular portion 7a of the first terminal plate 7 and the flange portion 1a and ensures the electrical insulation between the first terminal plate 7 and the base 1. The second insulating sheet 10 is manufactured by forming an insulating resin film, for example, a polyester film like a tube. The second insulating sheet 10 is interposed between the annular portion 8a of the second terminal plate 8 and the weight 11 (to be described later) and ensures the electrical insulation between the second terminal plate 8 and the weight 11.

The weight 11 is used to provide an excitation force to the piezoelectric element 5. The weight 11 is formed like a ring by using a metal material, for example, iron. The weight 11 is fitted onto the cylindrical portion 1b to face the piezoelectric element 5 across the annular portion 8a of the second terminal plate 8 and the second insulating sheet 10. The disc spring 12 is disposed at the side of the weight 11, which is opposite to the piezoelectric element. The nut 13 is screwed to the male screw portion 4 of the cylindrical portion 1b and serves to clamp-hold a laminated body fitted onto the cylindrical portion 1b, which includes the first insulating sheet 9, the annular portion 7a of the first terminal plate 7, the piezoelectric element 5, the annular portion 8a of the second terminal plate 8, the second insulating sheet 10, the weight 11, and the disc spring 12. Incidentally, the disc spring 12 and the nut 13 constitute the holding means.

The resin case 14 is manufactured by using an insulating synthetic resin, for instance, nylon 66, and by resin-molding the outer circumferential side of the base 1 other than both axially outer-circumferential sides of the base 1. Consequently, the laminated body including the aforementioned components, which is clamp-held between the flange portion 1a and the nut 13, is embedded in the resin case 14. The connector portion 15 has a pair of electric terminals 16 serve to draw an output signal and is mold-formed integrally with the resin case 14 to be extended from the outer periphery of the resin case 14.

A method of fabricating the knock sensor 100 constructed in this manner is described below.

First, the first insulating sheet 9 is fitted onto the cylindrical portion 1b and is placed on the flange portion 1a. Subsequently, the annular portion 7a of the first terminal plate 7, the piezoelectric element 5, the annular portion 8a of the second terminal plate 8, the second insulating sheet 10, the weight 11, and the disc spring 12 are sequentially fitted onto the cylindrical portion 8a by making the outside diameter thereof as a reference. Consequently, the first insulating sheet 9, the annular portion 7a of the first terminal plate 7, the piezoelectric element 5, the annular portion 8a of the second terminal plate 8, the second insulating sheet 10, the weight 11, and the disc spring 12 are concentrically stacked on the flange portion 1a. Then, the nut 13 is screwed onto the male screw portion 4. Subsequently, the nut 13 is fastened thereto with a predetermined torque by using a tool, such as a torque wrench. Consequently, the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12, is clamp-held between the flange portion 1a and the nut 13. Then, the connection terminal portions 7b and 8b are connected to the electric terminal 16 of the connector portion 15 by soldering or resistance-welding. Subsequently, the outer circumferential side of the base 1 is resin-molded by using an insulating synthetic resin, for example, nylon 66. Thus, the knock sensor 100 is manufactured.

The knock sensor 100 constructed in this manner is mounted in an internal combustion engine 52 by tighten attaching the bolts 51, which are inserted into the cylindrical portion 1b of the base 1, to the internal combustion engine 52. When knocking occurs in the internal combustion engine 52, the components, such as the piezoelectric element 5 and the weight 11, are vibrated integrally with a knocking vibration. The vibration is converted into a voltage signal by the piezoelectric element 5. This voltage signal is outputted to the outside from a female coupler (not shown) fitted into the connector portion 15 through the first terminal plate 7, the second terminal plate 8, and the electric terminal 16. Then, the voltage signal is supplied to the engine control unit (ECU (not shown)) adapted to control the internal combustion engine.

According to the first embodiment, the partial electrodes 6a and 6b are formed like a ring to face the radial outer circumferential portions of both the front and rear surfaces of the piezoelectric element 5 and to have a width narrower than the radial width of the piezoelectric element 5. Also, the inside diameters of the annular portions 7a and 8a of the first and second terminal plates 7 and 8 are set to be larger than those of the partial electrodes 6a and 6b. The portions 7a and 8a of the first and second terminal plates 7 and 8 are annularly formed so that the outside diameters of the annular portions 7a and 8a of the first and second terminal plates 7 and 8 are set to be substantially equal to that of the piezoelectric element 5. The annular portions 7a and 8a of the first and second terminal plates 7 and 8 are disposed to sandwich the piezoelectric element 5 and to be in contact with the partial electrodes 6a and 6b. In this sensor structure, the region, in which the partial electrodes 6a and 6b of the piezoelectric element 5 are not formed, that is, the electrode non-forming region does not face the annular portions 7a and 8a of the first and second terminal plates 7 and 8 in inside-diameter parts of the annular portions 7a and 8a. However, the electrode non-forming region faces the annular portions 7a and 8a in outside-diameter parts thereof. Thus, a voltage V generated in the partial electrode formation region of the piezoelectric element 5 due to the pyroelectric effects is given by the following equation:

$$V = P \times \Delta T \times S/C$$

where P designates the pyroelectric coefficient of the piezoelectric element 5, $\Delta T$ denotes a gradient of change in temperature, S designates the area of the electrode formation region, and C denotes the electrostatic capacity of the piezoelectric element. Incidentally, the pyroelectric coefficient is determined according to the material of the piezoelectric element and usually ranges from about $4 \times 10^{-8}$ to about $5 \times 10^{-8}$ C/cm$^2 \cdot °$C.

In the case of the knock sensor of the configuration according to the first embodiment, the gradient of change in temperature is assumed to be determined in a case where the knock sensor is quickly cooled by being submerged by water while a vehicle, in which the knock sensor is mounted, is moving. This is, for example, a case where the temperature of the knock sensor abruptly changes from 120° C. to 40° C. at a gradient of (−3)° C./second. Also, the piezoelectric element 5 has minimum outer circumferential electrode non-forming regions that are needed in a process of printing the partial electrodes. The necessary radial interval of the minimum outer circumferential electrode non-forming region is at least 0.1 mm to 0.2 mm. Also, in a case where silver paste is used, the electrode film is formed so that the thickness thereof usually ranges from about several microns to about ten-odd microns.

Next, the relation between a voltage generated in the electrode formation region and that generated in the electrode non-forming region is described below by referring to FIGS. 3A-3D. When change in temperature begins in the knock sensor, the voltage generated due to the pyroelectric effects in a critical part of an outer circumferential electrode formation region is nearly equal to that generated due to the pyroelectric effects in a critical part of an electrode non-forming region. Let V' denote a voltage generated in the outer circumferential portion electrode non-forming region. At a moment at which change in ambient temperature occurs, V=V'. However, as time passes, electric charges are discharged and reduced in an electrode formation condition through the terminal plates 7 and 8. In contrast, electric charges generated in the outer circumferential portion electrode non-forming region are partly moved to the electrode formation region. In a case where the gradient of change in temperature is very steep, a large part of the electric charges is left in the electrode non-forming region and is stored therein. However, when a certain time is elapsed after the change in temperature occurs, the following relation is established: V'>V. Also, the difference between the voltages V' and V increases with time. When the voltage difference (V'−V) exceeds a dielectric breakdown voltage of a gap corresponding to the electrode film thickness d between the annular portions 7a and 8a of the terminal plates 7 and 8 that face the outer circumferential electrode non-forming surface of the piezoelectric element 5, discharging is caused from the outer circumferential electrode non-forming surface of the piezoelectric element 5 toward the opposed annular portions 7a and 8a of the terminal plates 7 and 8.

Figure 4B:
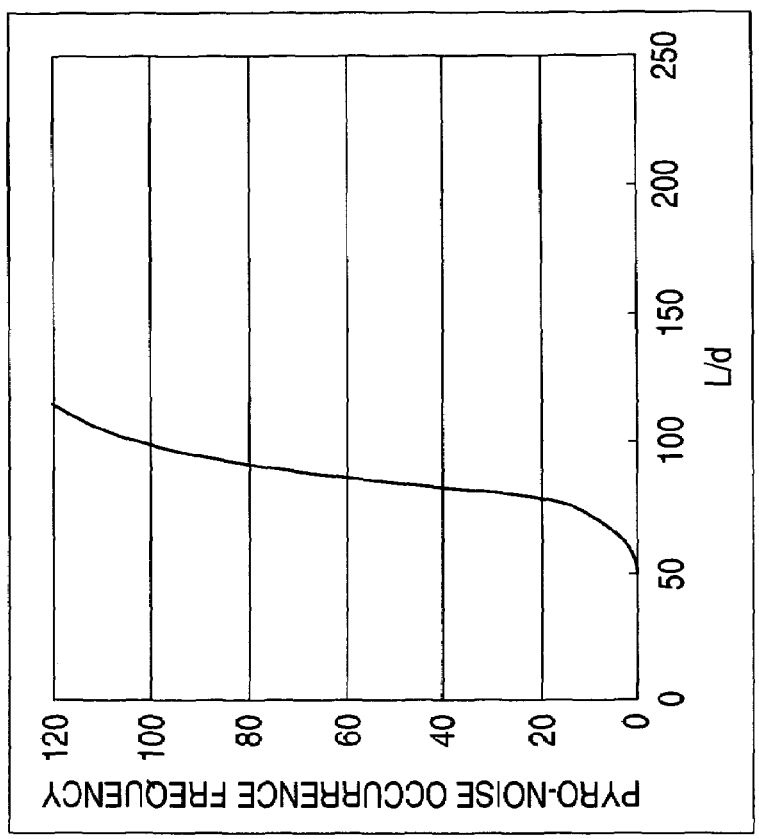
FIGS. 4A and 4B are graphs illustrating data that represents results of estimation of noises outputted due to pyroelectric effects from the knock sensor according to the first embodiment of the invention.
Figure 4A:
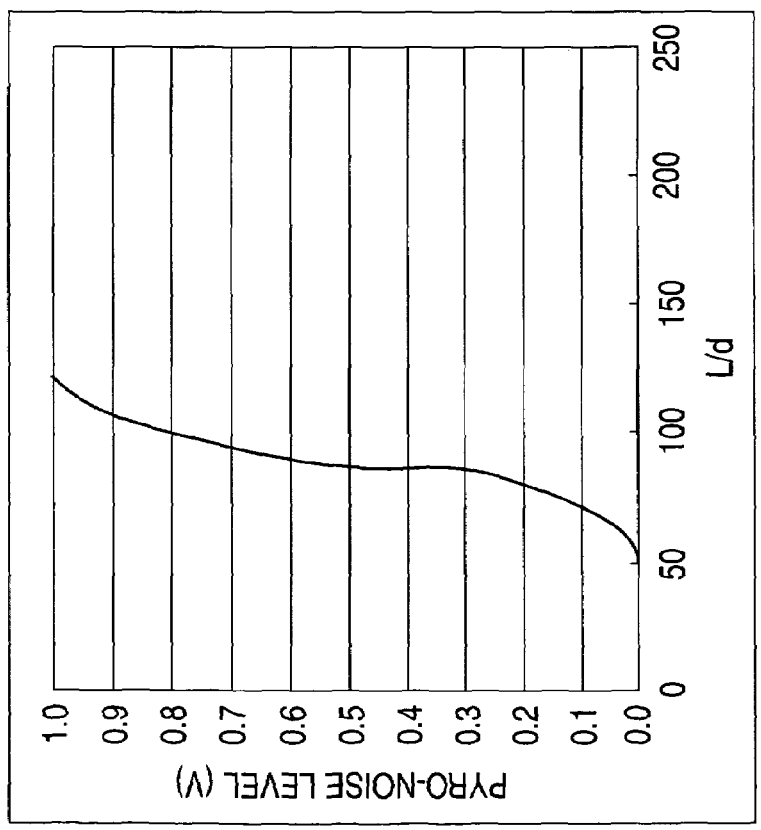

Meanwhile, a voltage required to cause a space discharge is increased by setting the electrode film thickness at a large value. Also, an amount of electric charge, which is generated due to the pyroelectric effects in the electrode non-forming region and is stored therein, can be suppressed by setting the radial distance L of the outer circumferential end electrode non-forming region at a small value. Focusing attention on these facts, noises generated in an output of this knock sensor due to the pyroelectric effects were verified. FIGS. 4A and 4B shows results of the verification.

Noises, which appeared in an output of the knock sensor according to the first embodiment when the temperature of the knock sensor was abruptly changed from 120° C. to 40° C. at a gradient of (−3)° C./second, were verified 200 seconds by this knock sensor. The abrupt change in temperature was assumed to occur, for example, in a case where in a case where the knock sensor was quickly cooled by being submerged by water while a vehicle, in which the knock sensor was mounted, was moving. Abscissas represent the ratio L/d of the radial interval L of the outer circumferential portion electrode non-forming regions of the piezoelectric element 5 to the electrode film thickness d. Ordinates of the left-side graph represent the level of a noise generated due to the pyroelectric effects. Ordinates of the right-side graph represent the frequency of occurrence of noises in a time of 200 seconds. These results show that when the value of the ratio L/d was equal to or less than 80, the levels of noises generated therein and the frequency of occurrence thereof were considerably suppressed. Additionally, it was found that no noises were generated due to the pyroelectric effects by preferably setting the ratio L/d to be equal to or less than 50.

Thus, a threshold value for judgment on a knocking signal in the ECU can be reduced by forming the annular portion electrodes of the piezoelectric element in a range in which the following inequality is satisfied: L/d<80. Consequently, erroneous judgment on a knocking signal can be prevented from being made in a low engine revolution region in which a knocking detection voltage according to related art is low. Also, it is desirable to form the annular portion electrodes of the piezoelectric element in a range in which the following inequality is satisfied: L/d<50. Consequently, the discharging itself of electric charges, which are generated due to the pyroelectric effects in the electrode non-forming region of the piezoelectric element 5, toward the annular portions 7a and 8a can be prevented.

As is apparent from the foregoing description, even in a case where the partial electrodes each having a predetermined electrode non-forming region extending from the outer circumferential portion C-chamfered end are formed on the outer circumferential portion of the piezoelectric element 5 according to the first embodiment, noises generated due to change in temperature are suppressed from being superimposed on an output signal. The generation of noises, which may cause the ECU to make an erroneous judgment on a knocking signal, can be prevented.

Also, the area of the electrode can be changed by changing the inside diameter of each of the annular partial electrodes 6a and 6b. That is, the electrostatic capacity of the piezoelectric element 5, which serves as a factor determining the output sensitivity of the knock sensor, can be changed by changing the widths of the partial electrodes 6a and 6b without changing the thickness and the diameter of the piezoelectric element 5. Additionally, each of the annular portions 7a and 8a of the first and second terminal plates 7 and 8 is formed into an annular shape in which the inside diameters of the annular portions 7a and 8a are larger than the inside diameters of the partial electrodes 6a and 6b and in which the outside diameters of the annular portions 7a and 8a are substantially equal to the outside diameter of the piezoelectric element. Thus, knock sensors, which have the same outer shape and differ in output sensitivity, can be realized by employing this sensor structure without changing the outside diameter and the shape of the sensor.

Also, the piezoelectric element is annularly formed. Moreover, the annular portions 7a and 8a of the first and second terminal plates 7 and 8 are annularly formed. Thus, when the piezoelectric element 5 and the annular portions 7a and 8a of the first and second terminal plates 7 and 8 are disposed in the base 1, these components can be fitted onto the cylindrical portion 1b of the base 1 by making the outside diameter thereof as a reference. Consequently, occurrences of displacement between the partial electrodes 6a and 6b of the piezoelectric element 5 and the annular portions 7a and 8a can be suppressed. Electric charges generated due to the pyroelectric effects associated with change in temperature can be prevented from being discharged toward the annular portions 7a and 8a.

Also, a plurality of engaging grooves 3a and 3b are formed in the outer circumferential surface of the flange portion 1a and the end outer circumferential surface of the cylindrical portion 1b, respectively. The touch area between the mold resin and each of the outer circumferential surfaces of both the axial ends of the base 1 is extremely large. Thus, the connection between the mold resin and each of the outer circumferential surfaces of both the axial ends of the base 1 can surely be achieved. Consequently, water can be prevented from entering the sensor from the boundary surface between the mold resin and the base 1 and reaching the annular portions 7a and 8a and the partial electrodes 6a and 6b to thereby corrode the electrode portion.

In the first embodiment, the inside diameter portions of the partial electrodes 6a and 6b do not overlap with those of the annular portions 7a and 8a in the direction of thickness. Thus, electric charges generated in the inside diameter side electrode non-forming region due to the pyroelectric effects associated with change in ambient temperature are not discharged toward the connection terminal portions 7b and 8b. Consequently, a more stable output can be obtained. Also, the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12, is resin-molded with the insulating synthetic resin in a clamp-held state. Thus, the insulating resin is present among the electrode non-forming region of the piezoelectric element 5 and the annular portions 7a and 8a of the first and second terminal plates 7 and 8. Consequently, electric charges generated in the electrode non-forming region of the piezoelectric element 5 due to the pyroelectric effects associated with change in temperature are prevented from being discharged toward the annular portions 7a and 8a.

Second Embodiment

Figure 5:
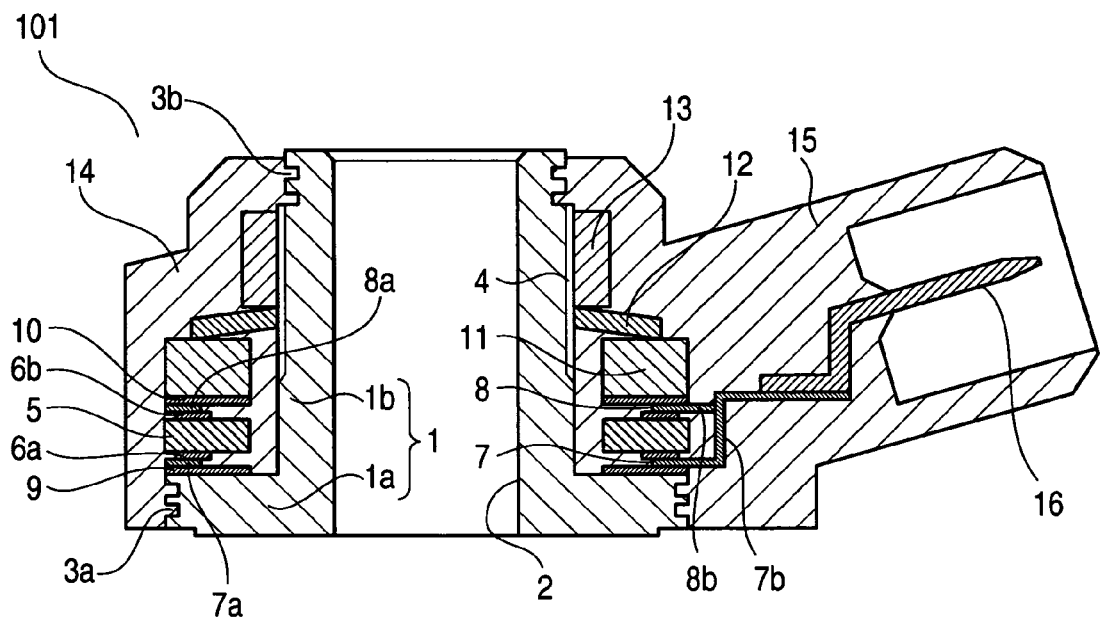
FIG. 5 is a longitudinally cross-sectional view illustrating a knock sensor according to a second embodiment of the invention.
Figure 6:
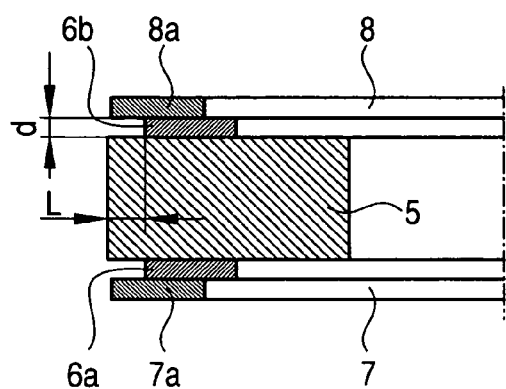
FIG. 6 is an enlarged cross-sectional view illustrating a primary part of the knock sensor according to the second embodiment of the invention.

FIG. 5 is a longitudinally cross-sectional view illustrating a knock sensor according to a second embodiment of the invention. FIG. 6 is an enlarged cross-sectional view illustrating a primary part of the knock sensor according to the second embodiment of the invention. Although the description of the first embodiment describes the case where the piezoelectric element 5 is provided with the C-chamfered part, the following description of the second embodiment describes a case where the piezoelectric element 5 is not provided with a C-chamfered part.

As shown in FIGS. 5 and 6, partial electrodes 6a and 6b are formed on the radial outer circumferential portions of both of the front and rear surfaces of the piezoelectric element 5 concentrically with the piezoelectric element 5 into an annular shape, in which the width of each of the partial electrodes 6a and 6b is narrower than the radial width of the piezoelectric element 5, by being spaced from the outer circumferential end of the piezoelectric element at a predetermined radial distance L to face each other. The partial electrodes 6a and 6b are obtained by applying an electrically conductive material, such as silver paste, thereto and then burning the material to have a predetermined thickness d (ranging from several microns to ten-odd microns or so). Incidentally, the partial electrodes 6a and 6b are formed so that the radial interval L of an outer circumferential terminal portion electrode non-forming surface and the thickness of the electrode thickness meet the following inequality: $L/d<80$, more preferably, $L/d<50$. Additionally, each of annular portions 7a and 8a of first and second terminal plates 7 and 8 is formed into an annular shape in which the inside diameters of the annular portions 7a and 8a are larger than the inside diameters of the partial electrodes 6a and 6b and in which the outside diameters of the annular portions 7a and 8a are substantially equal to the outside diameter of the piezoelectric element. Incidentally, the rest of the configuration of the second embodiment is similar to a corresponding part of the first embodiment.

In the second embodiment, a first insulating sheet 9, an annular portion 7a of a first terminal plate 7, the piezoelectric element 5, an annular portion 8a of a second terminal plate 8, a second insulating sheet 10, a weight 11, and a disc spring 12 are fitted onto the cylindrical portion 8a by making the outside diameter thereof as a reference. Consequently, these components are concentrically stacked on the flange portion 1a. Subsequently, a nut 13 is fastened with a predetermined torque by using a tool, such as a torque wrench. Consequently, the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12, is clamp-held between a flange portion 1a and the nut 13. Subsequently, the outer circumferential side of the base 1 is resin-molded by using an insulating synthetic resin, for example, nylon 66. Thus, a knock sensor 101 is manufactured.

In the knock sensor 101 constructed in this manner, the partial electrodes 6a and 6b are formed on the radial outer circumferential portions of both of the front and rear surfaces of the piezoelectric element 5 into an annular shape, in which the width of each of the partial electrodes 6a and 6b is narrower than the radial width of the piezoelectric element 5, by being spaced from the outer circumferential end of the piezoelectric element at a predetermined radial distance L to face each other. Incidentally, the partial electrodes 6a and 6b are formed so that the radial interval L of an outer circumferential terminal portion electrode non-forming surface and the thickness d of the electrode thickness meet the following inequality: $L/d<80$, more preferably, $L/d<50$. Additionally, each of the annular portions 7a and 8a of the first and second terminal plates 7 and 8 is formed into an annular shape in which the inside diameters of the annular portions 7a and 8a are larger than the inside diameters of the partial electrodes 6a and 6b and in which the outside diameters of the annular portions 7a and 8a are substantially equal to the outside diameter of the piezoelectric element. The annular portions 7a and 8a of the first and second terminal plates 7 and 8 are disposed to sandwich the piezoelectric element 5 and to be in contact with the partial electrodes 6a and 6b. Additionally, a space between a region, in which no partial electrodes are formed, of the piezoelectric element 5 and each of the annular portions 7a and 8a of the first and second terminal plates 7 and 8 is filled with an insulating resin.

Therefore, according to the second embodiment, even when the partial electrodes are formed in the piezoelectric element 5 is formed in the piezoelectric element 5, noises generated due to change in temperature are not superimposed on an output signal, so that a stable output can be obtained, similarly to the first embodiment. Also, knock sensors, which have the same outer shape and differ in output sensitivity, can be realized by employing this sensor structure without changing the outside diameter and the shape of the sensor. Additionally, the discharging of electric charges, which are generated due to the pyroelectric effects in the electrode non-forming region of the piezoelectric element 5, toward the annular portions 7a and 8a can be suppressed. Also, the generation of noises, which may cause the ECU to make an erroneous judgment on a knocking signal, can be prevented.

Third Embodiment

Figure 7:
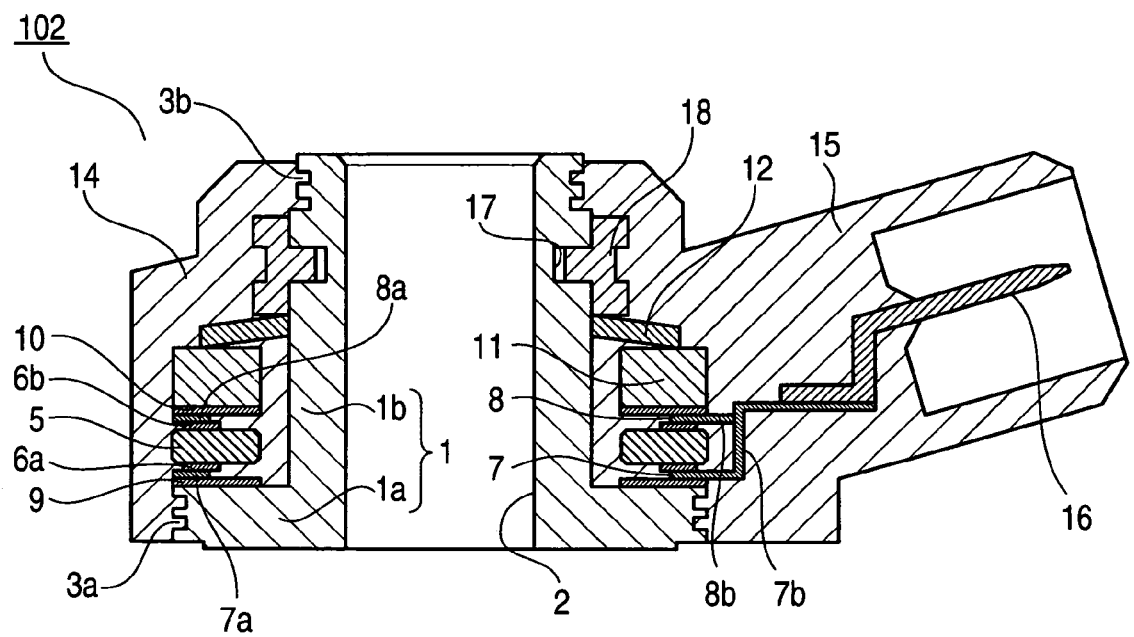
FIG. 7 is a longitudinally cross-sectional view illustrating a knock sensor according to a third embodiment of the invention.
Figure 8:
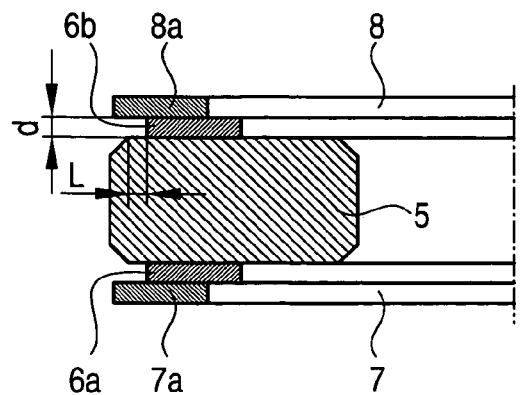
FIG. 8 is an enlarged cross-sectional view illustrating a primary part of the knock sensor according to the third embodiment of the invention.

FIG. 7 is a longitudinally cross-sectional view illustrating a knock sensor according to a third embodiment of the invention. FIG. 8 is an enlarged cross-sectional view illustrating a primary part of the knock sensor according to the third embodiment of the invention. The third embodiment is an example in which the piezoelectric element 5 is clamp-held by using an engaging groove 17 and a stopper ring 18, instead of a nut 13 according to the first embodiment.

As shown in FIG. 7, a base 1A is manufactured by using a metal material, for example, a steel material. The base 1A has an annular flange portion 1a and a cylindrical portion 1b axially extended from the flange portion 1a. A through hole 2 is formed to axially penetrate the flange portion 1a and the cylindrical portion 1b. Also, a plurality of engaging grooves 3a and 3b are formed in an outer circumferential surface of the flange portion 1a and an end outer-circumferential surface of the cylindrical portion 1b, respectively. Additionally, an engaging groove 17 is formed in a predetermined area of a tip-end-side outer circumferential surface of the cylindrical portion 1b.

A stopper ring 18 is fixed to the engaging groove 17 by caulking so that the laminated body fitted onto the cylindrical portion 1b, which includes a first insulating sheet 9, an annular portion 7a of a first terminal plate 7, the piezoelectric element 5, an annular portion 8a of a second terminal plate 8, a second insulating sheet 10, a weight 11, and a disc spring 12, is clamp-held between the stopper ring 18 and the flange portion 1a. Incidentally, the disc spring 12 and the stopper ring 18 constitute the holding means. Additionally, the rest of the configuration of the third embodiment is similar to a corresponding part of the first embodiment.

In the third embodiment, the first insulating sheet 9, the annular portion 7a of the first terminal plate 7, the piezoelectric element 5, the annular portion 8a of the second terminal plate 8, the second insulating sheet 10, the weight 11, and the disc spring 12 are fitted onto the cylindrical portion 8a by making the outside diameter thereof as a reference. Consequently, these components are concentrically stacked on the flange portion 1a. Subsequently, the stopper ring 18 is fitted onto the cylindrical portion 1b. Then, the stopper-ring 18 is overlaid on the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12. Subsequently, in a state in which the laminated body is pressed by a predetermined pressing force, the stopper ring 18 is fixed to the engaging groove 17 by caulking. Consequently, the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12, is clamp-held between the flange portion 1a and the stopper ring 18. Subsequently, the outer circumferential side of the base 1A is resin-molded by using an insulating synthetic resin, for example, nylon 66. Thus, a knock sensor 102 is manufactured.

In the knock sensor 102 constituted in this manner, the piezoelectric element 5 is fitted onto the cylindrical portion 1b of the base 1. The piezoelectric element 5 is provided with a predetermined C-chamfered part formed at an outer circumferential end. Also, partial electrodes 6a, 6b are formed concentrically with the piezoelectric element 5 in an annular shape, whose width is narrower than the radial width of the piezoelectric element 5, to face the radial outer circumferential 7 portion of the front and rear surfaces of the piezoelectric element 5 by being spaced at a predetermined radial distance L from an end of the C-chamfered part. The partial electrodes 6a and 6b are obtained by applying an electrically conductive material, such as silver paste, thereto and then burning the material to have a predetermined thickness d (ranging from several microns to ten-odd microns or so). Incidentally, the partial electrodes 6a and 6b are formed so that the radial interval L of an outer circumferential terminal portion electrode non-forming surface and the thickness d of the electrode thickness meet the following inequality: $L/d<80$, more preferably, $L/d<50$. Also, the inside diameters of the annular portions 7a and 8a of the first and second terminal plates 7 and 8 are set to be larger than those of the partial electrodes 6a and 6b. The portions 7a and 8a of the first and second terminal plates 7 and 8 are annularly formed so that the outside diameters of the annular portions 7a and 8a of the first and second terminal plates 7 and 8 are set to be substantially equal to that of the piezoelectric element 5. The annular portions 7a and 8a of the first and second terminal plates 7 and 8 are disposed to sandwich the piezoelectric element 5 and to be in contact with the partial electrodes 6a and 6b. Additionally, a space between a region, in which no partial electrodes are formed, of the piezoelectric element 5 and each of the annular portions 7a and 8a of the first and second terminal plates 7 and 8 is filled with an insulating resin.

Therefore, according to the third embodiment, even when the partial electrodes are formed in the piezoelectric element 5 is formed in the piezoelectric element 5, noises generated due to change in temperature are not superimposed on an output signal, so that a stable output can be obtained, similarly to the first embodiment. Also, knock sensors, which have the same outer shape and differ in output sensitivity, can be realized by employing this sensor structure without changing the outside diameter and the shape of the sensor. Additionally, the discharging of electric charges, which are generated due to the pyroelectric effects in the electrode non-forming region of the piezoelectric element 5, toward the annular portions 7a and 8a can be suppressed. Also, the generation of noises, which may cause the ECU to make an erroneous judgment on a knocking signal, can be prevented.

Fourth Embodiment

Figure 9:
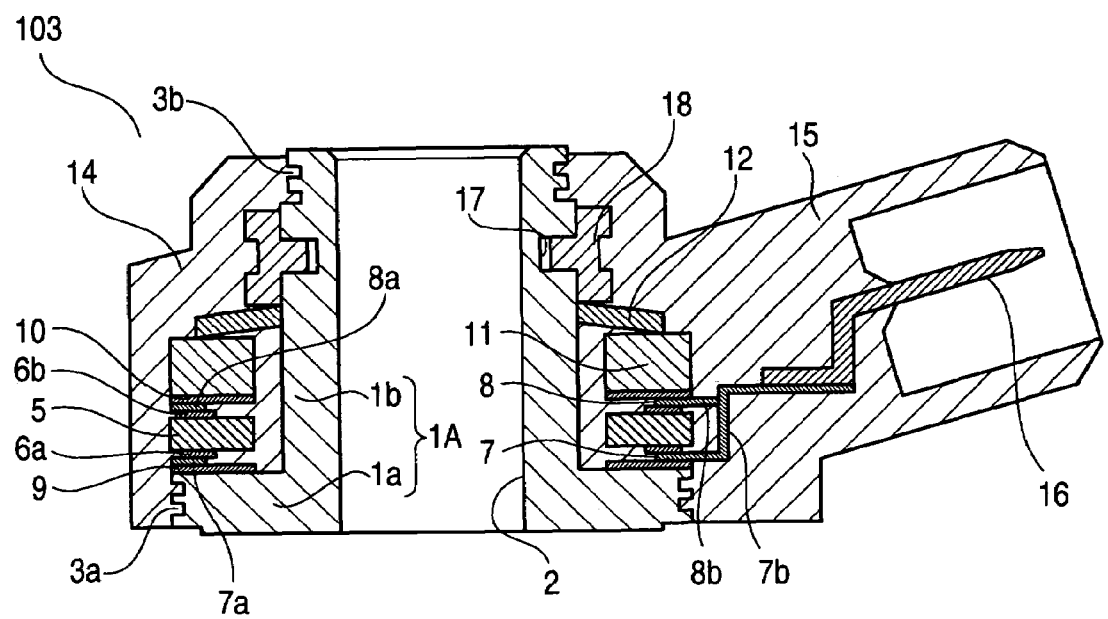
FIG. 9 is a longitudinally cross-sectional view illustrating a knock sensor according to a fourth embodiment of the invention.
Figure 10:
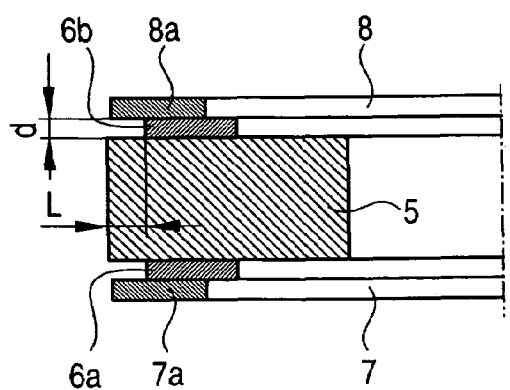
FIG. 10 is an enlarged cross-sectional view illustrating a primary part of the knock sensor according to the fourth embodiment of the invention.

FIG. 9 is a longitudinally cross-sectional view illustrating a knock sensor according to a fourth embodiment of the invention. FIG. 10 is an enlarged cross-sectional view illustrating a primary part of the knock sensor according to the fourth embodiment of the invention. The fourth embodiment is an example in which a piezoelectric element 5 is clamp-held by using an engaging groove 17 and a stopper ring 18, instead of the nut 13 according to the second embodiment.

As shown in FIG. 9, a base 1A is manufactured by using a metal material, for example, a steel material. The base 1A has an annular flange portion 1a and a cylindrical portion 1b axially extended from the flange portion 1a. A through hole 2 is formed to axially penetrate the flange portion 1a and the cylindrical portion 1b. Also, a plurality of engaging grooves 3a and 3b are formed in an outer circumferential surface of the flange portion 1a and an end outer-circumferential surface of the cylindrical portion 1b, respectively. Additionally, an engaging groove 17 is formed in a predetermined area of a tip-end-side outer circumferential surface of the cylindrical portion 1b. A stopper ring 18 is fixed to the engaging groove 17 by caulking so that the laminated body fitted onto the cylindrical portion 1b, which includes a first insulating sheet 9, an annular portion 7a of a first terminal plate 7, the piezoelectric element 5, an annular portion 8a of a second terminal plate 8, a second insulating sheet 10, a weight 11, and a disc spring 12, is clamp-held between the stopper ring 18 and the flange portion 1a. Incidentally, the disc spring 12 and the stopper ring 18 constitute the holding means. Additionally, the rest of the configuration of the fourth embodiment is similar to a corresponding part of the second embodiment.

In the fourth embodiment, the first insulating sheet 9, the annular portion 7a of the first terminal plate 7, the piezoelectric element 5, the annular portion 8a of the second terminal plate 8, the second insulating sheet 10, the weight 11, and the disc spring 12 are fitted onto the cylindrical portion 8a by making the outside diameter thereof as a reference. Consequently, these components are concentrically stacked on the flange portion 1a. Subsequently, the stopper ring 18 is fitted onto the cylindrical portion 1b. Then, the stopper ring 18 is overlaid on the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12. Subsequently, in a state in which the laminated body is pressed by a predetermined pressing force, the stopper ring 18 is fixed to the engaging groove 17 by caulking. Consequently, the laminated body, which includes the first insulating sheet 9, the annular portion 7a of the first terminal plate 7, the piezoelectric element 5, the annular portion 8a of the second terminal plate 8, the second insulating sheet 10, the weight 11, and the disc spring 12, is clamp-held between the flange portion 1a and the stopper ring 18. Subsequently, the outer circumferential side of the base 1A is resin-molded by using an insulating synthetic resin, for example, nylon 66. Thus, a knock sensor 103 is manufactured.

In the knock sensor 103 constituted in this manner, the piezoelectric element 5 is fitted onto the cylindrical portion 1b of the base 1. The piezoelectric element 5 is provided with a predetermined C-chamfered part formed at an outer circumferential end. Also, partial electrodes 6a, 6b are formed concentrically with the piezoelectric element 5 in an annular shape, whose width is narrower than the radial width of the piezoelectric element 5, to face the radial outer circumferential portion of the front and rear surfaces of the piezoelectric element 5 by being spaced at a predetermined radial distance L from an end of the C-chamfered part. The partial electrodes 6a and 6b are obtained by applying an electrically conductive material, such as silver paste, thereto and then burning the material to have a predetermined thickness d (ranging from several microns to ten-odd microns or so). Incidentally, the partial electrodes 6a and 6b are formed so that the radial interval L of an outer circumferential terminal portion electrode non-forming surface and the thickness d of the electrode thickness meet the following inequality: $L/d<80$, more preferably, $L/d<50$. Also, the inside diameters of the annular portions 7a and 8a of the first and second terminal plates 7 and 8 are set to be larger than those of the partial electrodes 6a and 6b. The portions 7a and 8a of the first and second terminal plates 7 and 8 are annularly formed so that the outside diameters of the annular portions 7a and 8a of the first and second terminal plates 7 and 8 are set to be substantially equal to that of the piezoelectric element 5. The annular portions 7a and 8a of the first and second terminal plates 7 and 8 are disposed to sandwich the piezoelectric element 5 and to be in contact with the partial electrodes 6a and 6b. Additionally, a space between a region, in which no partial electrodes are formed, of the piezoelectric element 5 and each of the annular portions 7a and 8a of the first and second terminal plates 7 and 8 is filled with an insulating resin.

Therefore, according to the fourth embodiment, even when the partial electrodes are formed in the piezoelectric element 5 is formed in the piezoelectric element 5, noises generated due to change in temperature are not superimposed on an output signal, so that a stable output can be obtained, similarly to the second embodiment. Also, knock sensors, which have the same outer shape and differ in output sensitivity, can be realized by employing this sensor structure without changing the outside diameter and the shape of the sensor. Additionally, the discharging of electric charges, which are generated due to the pyroelectric effects in the electrode non-forming region of the piezoelectric element 5, toward the annular portions 7a and 8a can be suppressed. Also, the generation of noises, which may cause the ECU to make an erroneous judgment on a knocking signal, can be prevented.

Incidentally, each of the embodiments has been described by assuming that each of the annular portions 7a and 8a of the first and second terminal plates 7 and 8 is formed into an annular shape to have an outside diameter that is substantially equal to the outside diameter of the piezoelectric element 5. Incidentally, the expression "substantially equal to" means that the values of the outside diameters of the annular portions 7a and 8a are not limited to those completely matched with that of the outside diameter of the piezoelectric element 5, and that variation of the value of the outside diameter of each of the annular portions 7a and 8a is allowed within a dimension tolerance range.

What is claimed is:

1. A knock sensor, comprising:
a base including an annular flange portion and a cylindrical portion that is axially extended from the flange portion, the base being provided with a through hole axially penetrate the flange portion and the cylindrical portion;
an annular piezoelectric element fitted onto the cylindrical portion;
electrode portions oppositely formed on front and rear surfaces of the annular piezoelectric element;
first and second terminal plates fitted onto the piezoelectric element, and being in close contact with the electrode portions to draw output signals from said piezoelectric element;
an annular weight fitted onto the cylindrical portion to supply an excitation force to the piezoelectric element;
a first insulating sheet interposed between the first terminal plate and the flange portion to electrically insulate the first terminal plate from the flange portion;
a second insulating sheet interposed between the second terminal plate and the weight to electrically insulate the second terminal plate from the weight; and
a holding unit that holds a laminated body of the first insulating sheet, the first terminal plate, the piezoelectric element, the second terminal plate, the second insulating sheet and the weight, such that the laminated body is clamped between the flange portion and the holding unit;
wherein each of the electrode portions includes a corresponding one of annular partial electrodes respectively formed to an outer circumference of the front and rear surfaces of the piezoelectric element, each of the annular partial electrodes having a width narrower than a radial width of the piezoelectric element; and
the annular partial electrodes have a thickness d that satisfies the following inequality: $L/d<80$ where L is a radial dimension of outer circumferences of the front and rear surfaces where the electrode portions are not arranged.

2. The knock sensor according to claim 1,
wherein each of the first and second terminal plates has an annular portion formed into an annular shape whose inside diameter is larger than an inside diameter of the partial electrode and whose outside diameter is substantially equal to an outside diameter of the piezoelectric element; and the annular portions are stacked to be in close contact with an entirety of surfaces of each of the partial electrodes.

3. The knock sensor according to claim 2,
wherein a space between a region, in which no partial electrodes are formed, of each of the front and rear surfaces of the piezoelectric element and each of the first and second insulating sheets is filled with an insulating resin.

4. A knock sensor, comprising:
a base including an annular flange portion and a cylindrical portion that is axially extended from the flange portion, the base being provided with a through hole axially penetrate the flange portion and the cylindrical portion;
an annular piezoelectric element fitted onto the cylindrical portion;
electrode portions oppositely formed on front and rear surfaces of the annular piezoelectric element;
first and second terminal plates fitted onto the piezoelectric element, and being in close contact with the electrode portions to draw output signals from said piezoelectric element;
an annular weight fitted onto the cylindrical portion to supply an excitation force to the piezoelectric element;
a first insulating sheet interposed between the first terminal plate and the flange portion to electrically insulate the first terminal plate from the flange portion;
a second insulating sheet interposed between the second terminal plate and the weight to electrically insulate the second terminal plate from the weight; and
a holding unit that holds a laminated body of the first insulating sheet, the first terminal plate, the piezoelectric element, the second terminal plate, the second insulating sheet and the weight, such that the laminated body is clamped between the flange portion and the holding unit;
wherein each of the electrode portions includes a corresponding one of annular partial electrodes respectively formed to an outer circumference of the front and rear surfaces of the piezoelectric element, each of the annular partial electrodes having a width narrower than a radial width of the piezoelectric element; and
the annular partial electrodes have a thickness d that satisfies the following inequality: $L/d<50$ where L is a radial dimension of outer circumferences of the front and rear surfaces where the electrode portions are not arranged.

5. The knock sensor according to claim 4,
wherein each of the first and second terminal plates has an annular portion formed into an annular shape whose inside diameter is larger than an inside diameter of the partial electrode and whose outside diameter is substantially equal to an outside diameter of the piezoelectric element; and
the annular portions are stacked to be in close contact with an entirety of surfaces of each of the partial electrodes.

6. The knock sensor according to claim 5,
wherein a space between a region, in which no partial electrodes are formed, of each of the front and rear surfaces of the piezoelectric element and each of the first and second insulating sheets is filled with an insulating resin.

* * * * *